United States Patent [19]
Kubota

[11] Patent Number: 6,056,328
[45] Date of Patent: May 2, 2000

[54] COUPLER FOR CONNECTING TUBULAR MEMBER WITHOUT DEFORMATION OF TUBULAR MEMBER DUE TO CONCENTRATION OF STRESS

[75] Inventor: Kazusige Kubota, Shizuoka, Japan

[73] Assignee: Yamaha Corporation, Japan

[21] Appl. No.: 09/061,673

[22] Filed: Apr. 16, 1998

[30] Foreign Application Priority Data

Apr. 23, 1997 [JP] Japan .................................. 9-120355

[51] Int. Cl.[7] .................................................. F16L 17/00
[52] U.S. Cl. ........................ 285/102; 285/308; 285/323
[58] Field of Search .................................. 285/101, 102, 285/308, 311, 902, 320, 322, 323

[56] References Cited

U.S. PATENT DOCUMENTS

| | | | |
|---|---|---|---|
| 2,819,733 | 1/1958 | Maisch | 285/320 X |
| 3,779,587 | 12/1973 | Racine | 285/323 X |
| 3,841,672 | 10/1974 | Schultz et al. | 285/320 X |
| 3,953,058 | 4/1976 | Soblesky | 285/320 X |
| 4,326,407 | 4/1982 | VanMeter | 285/102 X |
| 5,005,877 | 4/1991 | Hayman . | |

*Primary Examiner*—Dave W. Arola
*Attorney, Agent, or Firm*—Ostrolenk, Faber, Gerb & Soffen, LLP

[57] ABSTRACT

A coupler connects a gas leakage testing system to a pipe forming a part of a high pressure fluid conduit system, and a stationary case connected to the gas leakage testing system, a movable member movable in the inner space of the stationary case in an axial direction thereof, a coil spring urging the movable member in the axial direction, a split clamper arranged around the outer surface of the pipe and an axial force-to-radial force converter provided between the movable member and the split clamper form in combination the coupler; when the coupler is attached to the pipe, the coil spring urges the movable member in the axial direction, and the axial force-to-radial force converter inwardly exerts a radial force on the split clamper so as to grasp the pipe; since the split clamper is held in surface contact with the pipe, the pipe is never deformed due to concentration of a stress.

9 Claims, 4 Drawing Sheets

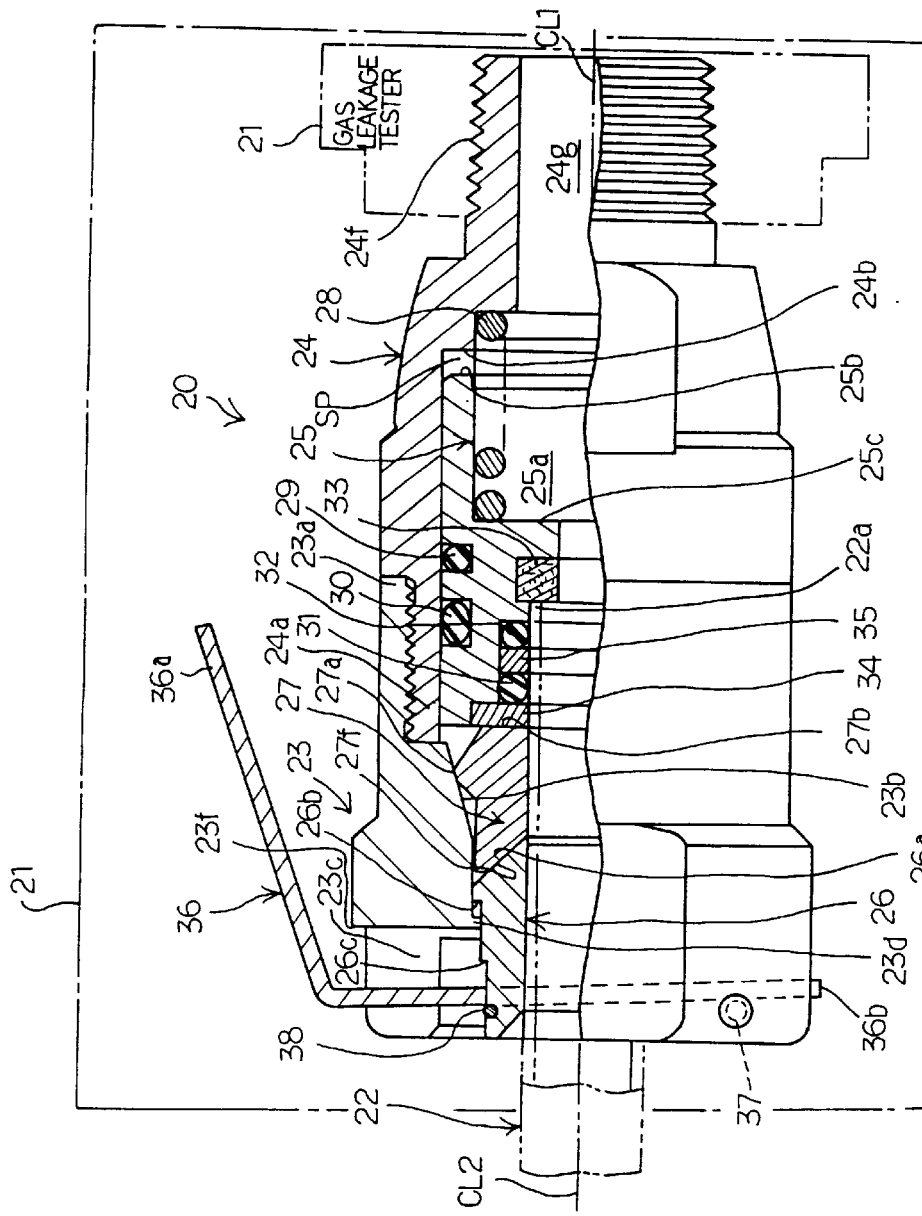
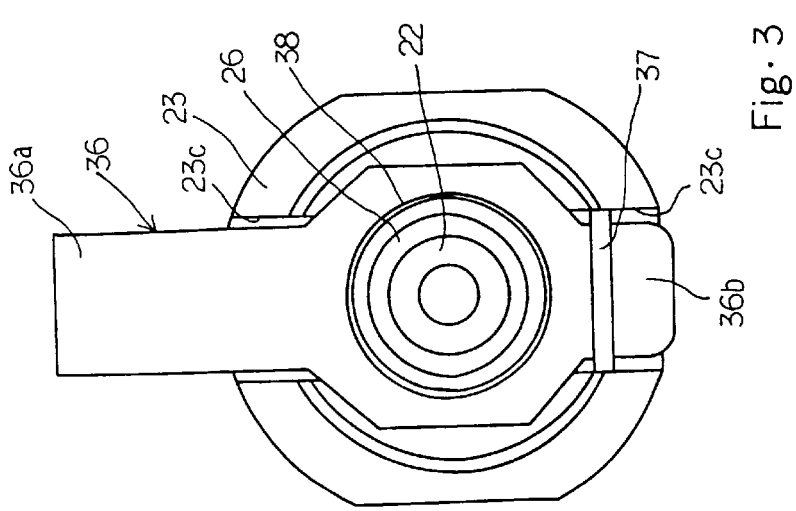

COUPLER FOR CONNECTING TUBULAR MEMBER WITHOUT DEFORMATION OF TUBULAR MEMBER DUE TO CONCENTRATION OF STRESS

FIELD OF THE INVENTION

This invention relates to a coupler and, more particularly, to a coupler for connecting additional equipment to a tubular member such as a pipe.

DESCRIPTION OF THE RELATED ART

The tubular members are assembled with each other by means of couplers, and form a conduit system for fluid. For example, a compressor delivers high-pressure gas to the fluid conduit system, and the fluid conduit system propagates the high-pressure gas to a destination. An additional equipment such as a pressure gauge is usually attached to the fluid conduit system, and such an additional equipment also requires a coupler for installation. Another additional equipment is a leakage testing system, and a typical example of the coupler for the leakage testing system is illustrated in FIG. 1.

The prior art coupler comprises a tubular member 1, an outer sleeve member 2, an inner sleeve member 3, lock balls 4 and a stop ring 5. The tubular member 1 has a step 1a, and the step 1a divides the tubular member 1 into a thin portion 1b and a thick portion 1c. A pipe 6 of a fluid conduit system is inserted through the hollow space of the thin portion 1b into the hollow space of the thick portion 1c. As a result, a pocket 1d is formed between the outer surface of the pipe 6 and the inner surface of the thick portion 1c. A step 1e is formed in the thin portion 1b, and a circular groove 1f extends in parallel to the step 1e. The stop ring 5 is inserted into the circular groove 1f. Plural through-holes 1g are further formed in the thin portion 1b, and are spaced from one another along the circumference of the thin portion 1b. The outer surface of the pipe 6 is exposed to the through-holes 1g. The lock balls 4 are provided in the through-holes 1g, respectively, and are held in contact with the outer surface of the pipe 6.

The outer sleeve member 2 has a circular bottom portion 2a and an outer wall portion 2b projecting from the periphery of the circular bottom portion 2a. A through-hole is formed in the circular bottom portion 2a, and the thin portion 1b is inserted into the through-hole. The step 1e prohibits the outer sleeve member 2 from the movement in the rightward direction, and the outer sleeve member 2 is fixed between the step 1e and the stop ring 5. The outer wall portion 2b is larger in diameter than the thin portion 1b, and a pocket 2c takes place between the outer surface of the thin portion 1b and the inner surface of the outer wall portion 2b.

The inner sleeve member 3 has a step portion 3a, and the step portion 3a divides the inner sleeve member 3 into a thick portion 3b and a thin portion 3c. The thick portion 3b is inserted into the pipe 6, and the thin portion 3c projects from the end surface 6a of the pipe 6. The thin portion 3c is threaded.

The prior art coupler further comprises a tapered sleeve member 7, a piston member 8, an adapter 9, a sheet packing 10, O seal rings 11/12/13 and a spring 14. The tapered sleeve member 7 has a tapered surface 7a and an outer threaded surface 7b. The tapered sleeve member 7 is inserted into the pocket 2c, and the lock balls 4 are held in contact with the tapered surface 7a. If the tapered sleeve member 7 is moved along the center axis CL of the prior art coupler, the lock balls 4 change the contact points on the tapered surface 7a, and the pressure against the pipe 6 is varied depending upon the relative position between the tapered surface 7a and the lock balls 4. When the tapered sleeve member 7 is rightwardly moved, the tapered surface 7a strongly presses the lock balls 4 against the outer surface of the pipe 6, and increases the friction between the lock balls 4 and the pipe 6. The large friction fixes the relative position between the pipe 6 and the tubular member 1. On the other hand, when the tapered sleeve member 7 is leftwardly moved, the tapered surface 7a decreases the friction between the lock balls 4 and the pipe 6, and the tubular member 1 becomes movable along the center axis CL.

The piston member 8 has an inner threaded surface 8a, and the inner threaded surface 8a is engaged with a thread 3d of the thin portion 3c. The sheet packing 10 is provided between the end surface 6a of the pipe 6 and the piston 8. The O seal ring 11 is inserted into the pocket 1d, and is crushed between the step 1a and the piston 8. A circular groove 8b is formed in the piston 8, and extends along the circumference of the piston 8. The O seal ring 12 is provided in the circular groove 8b, and is crushed between the piston 8 and the inner surface of the thick portion 1c. The sheet packing 10 and the O seal ring 11 are pressed against the end surface of the pipe 6 and the step 1a of the tubular member 1, respectively, and the sheet packing 10 and the crushed O seal rings 11/12 hermetically seal gas inside of the tubular member 1. The pipe 6 is sandwiched between the inner sleeve 3 and the piston 8, and the right end portion of the piston 8 projects from the tubular member 1. The adapter 9 has an inner threaded portion 9a, a circular groove 9b and a pocket 9c. The O seal ring 13 is accommodated in the circular groove 9b, and the right end portion 8c is inserted into the pocket 9c. The O seal ring 13 is crushed between the piston 8 and the adapter 9, and does not allow the gas to flow through the gap between the right end portion 8c and the adapter 9. The inner threaded portion 9a is engaged with the outer threaded portion 7b of the tapered sleeve member 7, and the spring 14 is compressed between the piston 8 and the adapter 9. The spring 14 presses the piston 8 against the sheet packing 6a, which in turn is pressed against the end surface 6a of the pipe 6. For this reason, the piston 8c is stationary with respect to the pipe 6, and the adapter 9 and the tapered sleeve member 7 engaged therewith are movable against the spring 14 along the center axis CL. When the outer sleeve 2 is rightwardly moved against the spring 14, the tubular member 1 is also moved rightwardly, and changes the contact points between the tapered surface 7a and the lock balls 4. The lock balls 4 are released from the tapered surface 7a, and the pressure is removed from the pipe 6. As a result, the prior art coupler is separated from the pipe 6.

The adapter 9 has a threaded projection 9d, and a through-hole 9e is formed in the threaded projection 9d. The through-hole 9e is open to the pocket 9c, and guides the high-pressure gas to a gas leakage testing system (not shown).

The gas leakage testing system is assembled with the prior art coupler. An operator fixes the adapter 9, and pushes the outer sleeve rightwardly against the elastic force of the coil spring 14. Then, the prior art coupler is shrunk against the elastic force of the coil spring 14, and the lock balls 4 are released from the tapered surface 7a. The operator inserts the pipe 6 into the tubular member 1, and the end surface 6a is brought into contact with the sheet packing 10. The lock balls 4 do not impede the insertion of the pipe 6, because the lock balls 4 are not engaged with the tapered surface 7a. The operator releases the outer sleeve 2, and the compressed spring 14 moves the adapter 9 and the tapered sleeve member 7 rightwardly, and the tapered surface 7a strongly presses the lock balls 4 against the outer surface of the pipe 6.

On the other hand, when the gas leakage testing system is detached from the pipe 6 together with the prior art coupler, an operator rightwardly pushes the outer sleeve member 2, and the tubular member 1 rightwardly slides together. The tubular member 1 pushes the lock balls 4, and the tapered sleeve member 7 and the lock balls 4 change the relative position. The tapered surface 7a relieves the lock balls 4 from the radial force component, and the tubular member 1 smoothly slides on the pipe 6. Thus, the operator detaches the prior art coupler from the pipe 6.

As will be understood, the operator easily attaches the gas leakage testing system to and detaches it from the pipe by using the prior art coupler. However, the prior art coupler encounters a problem in that the lock balls 4 damage the pipe 6. This is because of the fact that the lock balls 4 are pressed through the point contact. The tapered surface 7a generates the radial force component perpendicular to the center axis CL, and the radial force component is concentrated at the pint contact. As a result, the lock balls 4 exert extremely large force on the contact points to the outer surface of the pipe 6, and the extremely large force plastically deforms the pipe 6. If the fluid conduit system propagates high pressure fluid, the high-pressure fluid causes the adapter 9 to be rightwardly moved, and the tapered surface 7a further increases the radial force component. The increased radial force component makes the plastic deformation serious.

SUMMARY OF THE INVENTION

It is therefore an important object of the present invention to provide a coupler, which does not seriously damage a tubular member coupled thereto.

To accomplish the object, the present invention proposes to grasp a second member such as a pipe through a surface contact between a clamper and the second member.

In accordance with one aspect of the present invention, there is provided a coupler for connecting a first member to a second member, and the coupler comprises a stationary member connected to the first member and having an inner space extending a first direction and open at one end thereof, a movable member provided between the stationary member and the second member projecting from the opening at the one end of the stationary member and movable in the inner space in the first direction and vice versa, an elastic member accommodated in the inner space between the stationary member and the movable member and urging the movable member in the first direction, a clamper provided between the second member and the movable member, supported by the movable member and movable in a second direction perpendicular to the first direction and vice versa and a converter provided between the movable member and the clamper and converting a motion of the movable member in the first direction and vice versa to a motion of the clamper in the second direction and vice versa so as to bring the clamper into surface contact with the second member through the motion of the clamper in the second direction and release the clamper from the surface contact with the second member through the motion of the clamper in the opposite direction to the second direction.

BRIEF DESCRIPTION OF THE DRAWINGS

The features and advantages of the coupler will be more clearly understood from the following description taken in conjunction with the accompanying drawings in which:

FIG. 2 is a partially cross sectional front view showing a coupler according to the present invention;

FIG. 3 is a side view showing the coupler;

DESCRIPTION OF THE PREFERRED EMBODIMENT

Figure 1:
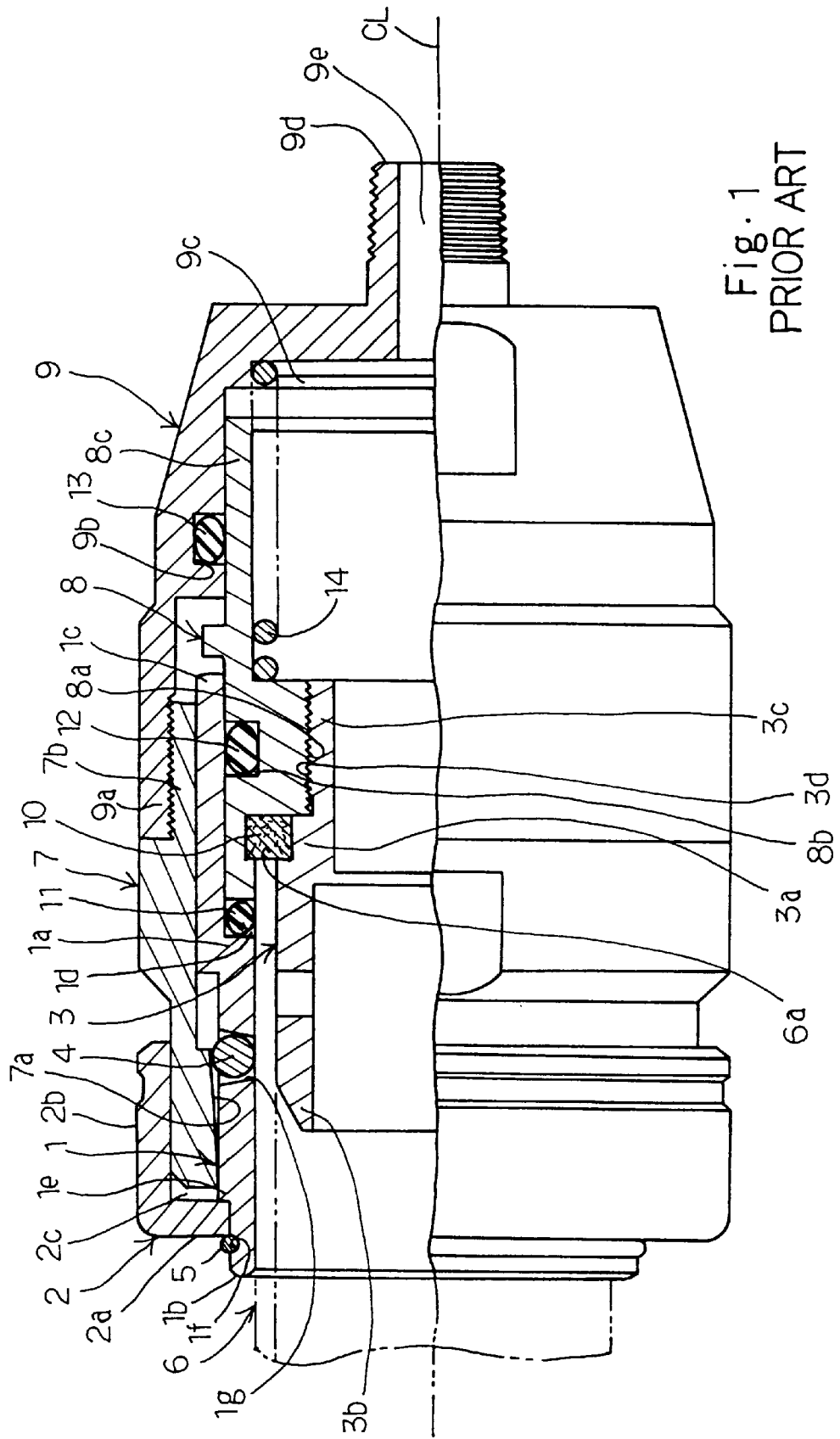
FIG. 1 is a partially cross sectional front view showing the prior art coupler for connecting the leakage testing system to the fluid conduit system.

Referring to FIGS. 2 and 3 of the drawings, a coupler 20 embodying the present invention connects a pipe of a gas leakage testing system 21 to a pipe 22 forming a part of a gas conduit system. The coupler 20 has a center axis CL1, and the pipe 22 also has a center axis CL2. The center axis CL1 of the coupler 20 is aligned with the center axis CL2 of the pipe 22. Though not shown in the drawings, the gas leakage testing system 21 is connected to a vacuum pump and a high pressure helium gas source.

The coupler 20 comprises a tapered sleeve member 23 and an adapter 24. The tapered sleeve member 23 is shaped in a generally cylindrical configuration, and the adapter 24 has a generally cup-like configuration. The tapered sleeve member 23 has an inner threaded portion 23a, and the adapter 24 has an outer threaded portion 24a. The inner threaded portion 23a is engaged with the outer threaded portion 24a, and the tapered sleeve member 23 and the adapter 24 form an inner space SP much wider than the pipe 22. The tapered sleeve member 23 has a tapered surface 23b exposed to the inner space SP.

The coupler 20 further comprises a piston 25, a tubular pusher 26 and a split clamper 27. The piston 25, the tubular pusher 26 and the split clamper 27 have respective center axes aligned with the center axes CL1/CL2, and are accommodated in the inner space SP.

The coupler 20 further comprises a coil spring 28, O seal rings 29/30/31/32, a ring-shaped packing member 33 and washers 34/35. An inner circular groove is formed in the piston 25, and the ring-shaped packing member 33 is received in the inner circular groove. A recess 25a is further formed in the piston 25, and is exposed to an end surface 25b. The coil spring 28 is inserted between the bottom surface 25c of the recess 25a and the bottom surface 24b of the recess formed in the adapter 24, and leftwardly urges the piston 25 at all times. As a result, the ring-shaped packing member 33 is usually pressed against an end surface 22a of the pipe 22 due to the elastic force of the coil spring 28. However, if the piston 25 is rightwardly pushed, the piston 25 rightwardly slides, and the end surface 25b is brought into contact with the bottom surface 24b.

A narrow inner circular groove and a wide inner circular groove contiguous to the narrow inner circular groove are further formed in the piston 25, and define a circular recess together with the outer surface of the pipe 22. The O seal ring 32, the washer 35, the O seal ring 31 and the washer 34 are alternately inserted into the circular recess, and do not allow high-pressure gas to pass through the gap between the pipe 22 and the piston 25. Outer circular grooves are further formed in the piston 25, and are exposed to the outer surface of the piston 25. The O seal rings 29/30 are inserted into the outer circular grooves, and do not allow the high-pressure gas to pass through the gap between the piston 25 and the adapter 24. In this way, the high pressure gas is hermetically sealed in the inner space SP, and is never leaked from the pipe 22 to the inner space occupied by the split clamper 27 and the tubular pusher 26.

Figure 4:
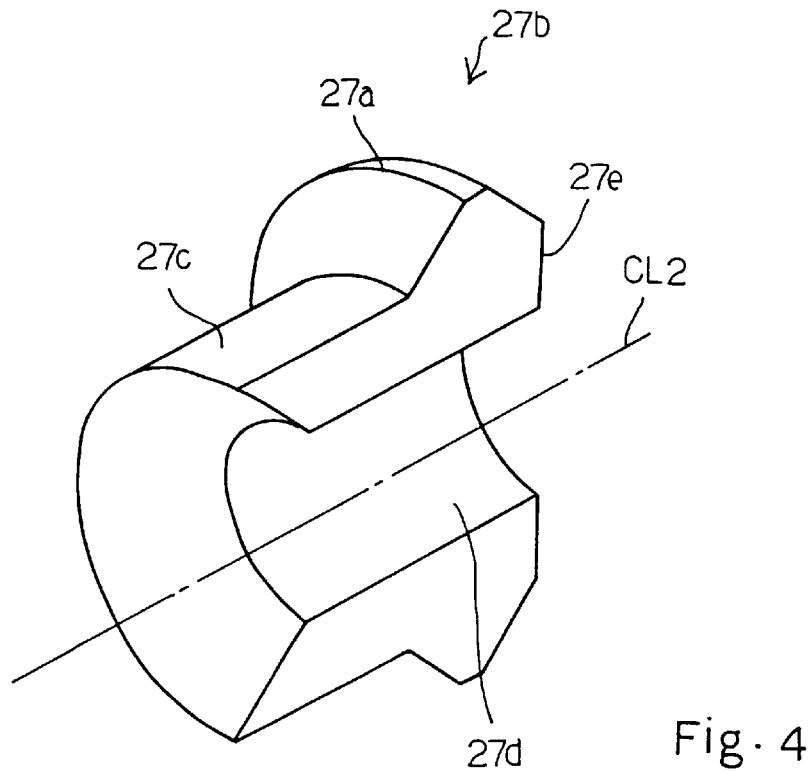
FIG. 4 is a perspective view showing a part of a split clamper incorporated in the coupler according to the present invention.
Figure 5:
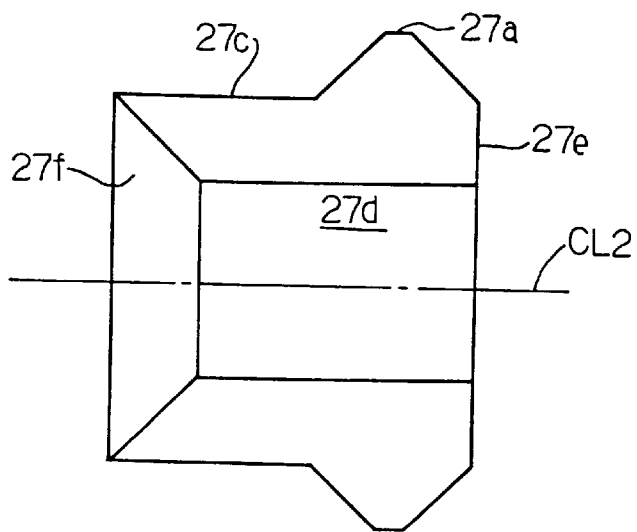
FIG. 5 is a front view showing the part of the split clamper.
Figure 6:
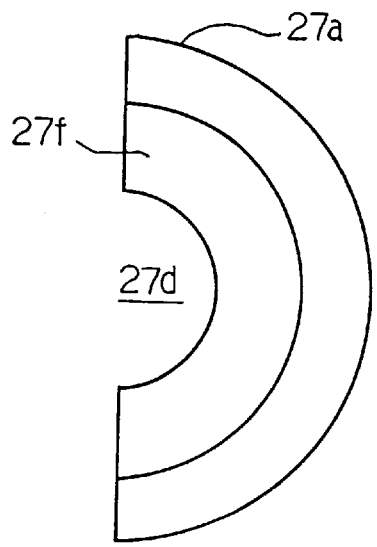
FIG. 6 is a side view showing the part of the split clamper.

The split clamper 27 is slidable on the outer surface of the pipe 22 in the direction of the center axis CL2, and has sectorial ridges 27a. In this instance, two halves 27b form in combination the split clamper 27, and one of the two halves 27b is shown in FIGS. 4, 5 and 6. The half 27b has a boss portion 27c, and the sectorial ridge 27a radially projects from the boss portion 27c. A semi-cylindrical recess 27d is formed in the half 27b, and two halves 27b form a generally cylindrical space. Although the inner surface defining the semi-cylindrical recess is equal in radius of curvature to the outer surface of the pipe 22, the virtual sector along the inner surface is less than 180 degrees. For this reason, when the halves 27b are put on the outer surface of the pipe 22, extremely narrow gaps take place between the halves 27b. One end surface 27e is perpendicular to the center axis CL2, and the other end surface 27f is oblique with respect to the center axis CL2.

The perpendicular end surface 27e is held in contact with the washer 34, and the piston 25 leftwardly urges the split clamper 27 due to the elastic force of the coil spring 28. The split clamper 27 is slidable on the outer surface of the pipe 22 along the center axis CL2, and the ridge 27a is brought in contact with the tapered surface 23b. The tapered surface 23b exerts a radial force component to the split clamper 27, and the split clamper 27 grasps the pipe 22.

The tubular pusher 26 is also slidable on the outer surface of the pipe 22, and has an oblique end surface 26a. The oblique end surface 26a is held in contact with the oblique end surface 27f of the split clamper 27. The tubular pusher 26 is stepwise decreased in diameter toward the left side, and steps 26b and 26c takes place on the outer surface of the tubular pusher 26. The step 26b is brought into contact with a ring-shaped projection 23d of the tapered sleeve member 23, and does not allow the tubular pusher 26 to be moved over the ring-shaped projection 23d.

The adapter 24 further has a tapered projection 24f, and the outer surface of the tapered projection 24f is threaded. A guide hole 24g is formed in the tapered projection 24f along the center line CL1, and is open to the inner space SP. The pipe of the gas leakage testing system 21 is engaged with the tapered projection 24f, and the high pressure gas is applied to the gas leakage testing system through the guide hole 24g.

The coupler 20 further comprises a manipulator 36, a pin 37 and a stop ring 38. The tapered sleeve member 23 is partially cut away, and a slit 23c is formed in the tapered sleeve member 23. The slit 23c perpendicularly extends with respect to the center axis CL2, and the pin bridges the slit 23c (see FIG. 3). The manipulator 36 is bent, and an operator grasps one end portion 36a. A circular opening is formed in the other end portion 36b, and the tubular pusher 26 is inserted into the circular opening. The stop ring 38 is inserted into a circular groove formed in the left end portion of the tubular pusher 26, and the stop ring 38 and the step 26c restrict the motion of the other end portion 36b of the manipulator 36. The other end portion 36b is engaged with the pin 37, and the pin 37 serves as a fulcrum. When an operator pushes down the end portion 36a, the manipulator 36 is rotated around the pin 37 in the clockwise direction, and the other end portion 36b pushes the step 26c so that the tubular pusher 26 slides rightwardly. On the other hand, when the operator releases the end portion 36a, the coil spring 28 urges the adapter 24 and the tapered sleeve member 23 leftwardly, and the tapered surface 23b and the ridge 27a change the contact point therebetween.

Assuming now that the coupler 20 is detached from the pipe 22, the coil spring 28 leftwardly urges the piston 25, and the piston 25 pushes the split clamper 27 leftwardly. The sectorial ridges are pressed against the tapered surface 23b, and receive the reaction force. The radial reaction component inwardly moves the halves 27b, and the halves 27b are brought into contact with each other along the side edges. The oblique end surface 27f is held in contact with the oblique end surface 26a, and the halves 27b does not fall into the inner space SP.

When an operator assembles the coupler 20 with the pipe 22, the operator rotates the manipulator 36 in the clockwise direction, and the tubular pusher 26 pushes the split clamper 27 rightwardly. The sectorial ridges 27a slides along the tapered surface 23b, and the halves 27b are radially spread. The oblique end surface 27f slides on the oblique end surface 26a, and the oblique end surface 26a supports the halves 27b.

The split clamper 27 in turn pushes the piston 25 against the elastic force of the coil spring 28, rightwardly, and the end surface 25b is brought into contact with the bottom surface 24b of the adapter 24. Then, even if the operator continuously exerts the force on the manipulator 36, the pusher 26, the split clamper 27 and the piston 25 are not moved any more. The split clamper 32 maximizes the generally cylindrical space, which is larger in diameter than the pipe 22 to be inserted therein.

The operator inserts the pipe 22 into the tubular pusher 26, the split clamper 27 and the piston 25 without removing the force from the manipulator 36. When the end surface 22a is brought into contact with the ring-shaped packing member 33, the operator releases the manipulator 36. Then, the coil spring 28 leftwardly urges the piston 25, and the piston 25 pushes the split clamper 27 leftwardly. The sectorial ridges 27a slide one the tapered surface 23b, and receive the radial reaction component from the tapered surface 23b. Then, the halves 27b are inwardly moved, and the inner surfaces of the halves 27b grasp the outer surface of the pipe 22. The halves 27b are held in surface contact with the pipe 22, and the radial reaction component is not concentrated on a certain narrow area of the outer surface of the pipe 22. For this reason, the pipe 22 is never damaged. Moreover, a pair of halves makes the center axis of the pipe 22 automatically aligned with the center axis CL2.

The coil spring 28 exerts constant elastic force on the piston 25, and, accordingly, the split clamper 27 grasps the pipe 22 constantly. Even if the high pressure gas rightwardly pushes the adapter 24, the adapter 24 pulls the tapered sleeve member 23, and the tapered sleeve member 23 increases the radial reaction component exerted on the sectorial ridges 27a. As a result, the split clamper 27 strongly grasps the pipe 22, and does not come out from the pipe 22. Although the grasping force is increased, the grasping force merely increases the pressure a little, and the pipe 22 is never damaged.

When an operator detaches the coupler 20 from the pipe 22, the operator rotates the manipulator 36 in the clockwise direction, and the tubular pusher 26 radially spreads the halves 27b. As a result, the grasping force is removed from the outer surface of the pipe 22, and the operator smoothly separates the coupler 20 from the pipe 22.

In this instance, the tapered sleeve member 23 and the adapter 24 as a whole constitute a stationary member, and the piston 25 and the tubular pusher 26 form in combination a movable member. The halves 27b as a whole constitute a clamper. The coil spring 28 serves as an elastic member, and the tapered surface 23b and the sectorial ridges 27a realize a converter.

As will be appreciated from the foregoing description, the split clamper 27 is held in surface contact with the pipe 22, and never damages the pipe 22. Even though the high pressure gas increases the radial reaction component, the radial reaction component is dispersed over the inner surfaces of the halves 27b, and the split clamper 27 does not damage the pipe 22.

In the embodiment described hereinbefore, the split clamper 27 is implemented by the halves 27b arranged in symmetry with respect to the center axis CL2, and the halves 27b automatically align the pipe 22 with the coupler 20. Moreover, the manipulator 36 allows the operator to change the relative position between the tapered surface 23b and the sectorial ridges 27a by using only one hand, and the operator easily attaches the coupler to and detaches it from the pipe 22.

Although a particular embodiment of the present invention has been shown and described, it will be apparent to those skilled in the art that various changes and modifications may be made without departing from the spirit and scope of the present invention.

For example, the coupler according to the present invention may connect an equipment to a pipe forming a part of a high-pressure liquid conduit system. The coupler may be connected to a rod.

The split clamper may be formed by more than two pieces. If three pieces form the split clamper, each piece covers less than 120 degrees of the outer surface of the pipe 22. Only one half 27b may serve as the clamper 27, and the half 27b may have a c-letter cross section.

The end portion 36a may be brought into contact with the upper end 23f of the tapered sleeve member 23 before the contact between the end surface 25b and the bottom surface 24b.

The clamper may be formed of resilient material.

The ridge and the tapered surface may be replaced. Namely, the ridge is formed in the sleeve member 23, and the split clamper 23 provides a tapered surface.

Figure 7:
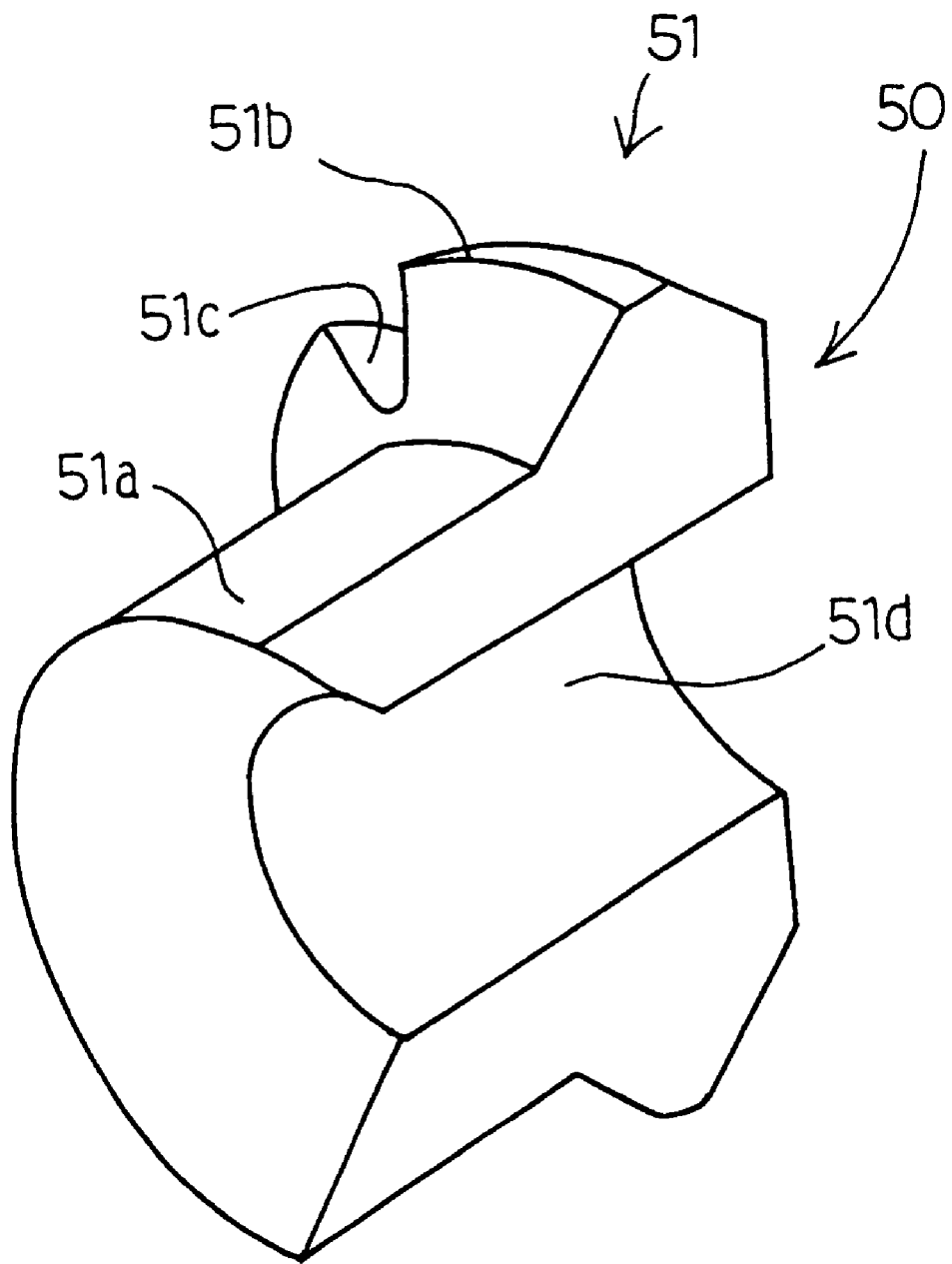
FIG. 7 is a perspective view showing a modification of the part of the split clamper.

The half 27a/27b may be modified as shown in FIG. 7. The modification also has a boss portion and a ridge 51b, and a slit 51c is formed in the ridge 51b. When the ridge 51b slides on the tapered surface, the slit 51c allows the halves 51 to be deformed, and the entire inner surface 51d is held in contact with the outer surface of the pipe.

The through-hole 9e may be closed with a cap. In this instance, the cap serves as a first member.

Finally, the pusher and the tapered sleeve may not be tubular. The pusher is expected to move the split clamper 27 along the center axis CL2, and the tapered sleeve is to generate a radial reaction component.

What is claimed is:

1. A coupler for connecting a first member to a second member, comprising:

a stationary member connected to said first member, and having an inner space extending in a first direction and open at one end thereof;

a movable member provided between said stationary member, said second member projecting from the opening at said one end of said stationary member, and movable in said inner space in said first direction and in a direction opposite to said first direction;

an elastic member accommodated in said inner space between said stationary member and said movable member, and urging said movable member in said first direction;

a clamper provided between said second member and said movable member, supported by said movable member, and movable in a second direction perpendicular to said first direction and in a direction opposite to said second direction; and a converter for converting a motion of said movable member in said first direction and in said direction opposite to said first direction to a motion of said clamper in said second direction and in said direction opposite to said second direction so as to bring said clamper into surface contact with said second member through said motion of said clamper in said second direction and release said clamper from the surface contact with said second member through said motion of said clamper in said direction opposite to said second direction.

2. The coupler as set forth in claim 1, in which said converter includes a tapered surface formed in said stationary member and obliquely extending with respect to said first direction, and a ridge formed on said clamper and slidable on said tapered surface so as to convert said motion of said movable member in said first direction and said direction opposite to said first direction to said motion of said clamper in said second direction and said direction opposite to said second direction.

3. The coupler as set forth in claim 2, in which said clamper has a contact surface brought into contact with an outer surface of said second member, and said ridge outwardly projects from said contact surface into sliding engagement with said tapered surface.

4. The coupler as set forth in claim 2, in which said clamper comprises plural clamping sub-members arranged around said outer surface of said second member, and said plural clamping sub-members have respective contact sub-surfaces pressed against said outer surface of said second member and sub-ridges outwardly projecting from said contact sub-surfaces, respectively, into respective sliding engagement with said tapered surface.

5. The coupler as set forth in claim 4, in which said plural clamping sub-members are symmetrically arranged on said outer surface.

6. The coupler as set forth in claim 1, further comprising a manipulator connected to said movable member so as to forcibly move said movable member in said direction opposite to said first direction.

7. The coupler as set forth in claim 6, further comprising respective sealing members provided between said second member and said movable member and between said movable member and said stationary member so as to hermetically sealing a high pressure fluid inside of said coupler.

8. The coupler as set forth in claim 7, in which a guide hole is formed in said stationary member, and propagates said high pressure fluid to said first member.

9. The coupler as set forth in claim 8, in which said second member is a pipe for propagating said high pressure fluid, and said first member is a leakage testing system.

* * * * *